United States Patent
Kao et al.

(10) Patent No.: US 12,540,885 B2
(45) Date of Patent: Feb. 3, 2026

(54) TUBULAR ASSEMBLY AND FLOW GUIDING DEVICE OF THE SAME

(71) Applicant: Te-Hsien Kao, Hsinchu (TW)

(72) Inventors: Te-Hsien Kao, Hsinchu (TW); Meng-Chun Tsou, Taichung (TW)

(73) Assignee: Te-Hsien Kao, Hsinchu (TW)

( * ) Notice: Subject to any disclaimer, the term of this patent is extended or adjusted under 35 U.S.C. 154(b) by 426 days.

(21) Appl. No.: 18/338,822

(22) Filed: Jun. 21, 2023

(65) Prior Publication Data
US 2024/0426714 A1   Dec. 26, 2024

(51) Int. Cl.
*G01N 1/20* (2006.01)
*G01N 1/22* (2006.01)

(52) U.S. Cl.
CPC ......... *G01N 1/2035* (2013.01); *G01N 1/2247* (2013.01)

(58) Field of Classification Search
CPC ....... G01N 1/2035; G01N 1/2247; G01F 1/40
USPC .... 73/64.56, 706, 707, 863.31, 863.33, 756, 73/863.57, 863.61, 863.71, 863.81, 73/864.73; 374/147, 148; 138/108
See application file for complete search history.

(56) References Cited

U.S. PATENT DOCUMENTS

| | | | |
|---|---|---|---|
| 3,625,065 A * | 12/1971 | Thompson | G01N 1/2035 73/863.61 |
| 2003/0070718 A1 * | 4/2003 | Benham | F15D 1/14 137/861 |
| 2020/0268280 A1 * | 8/2020 | Stambeck | A61B 90/03 |

FOREIGN PATENT DOCUMENTS

GB    2043916 A  * 10/1980   ............... G01F 5/00

* cited by examiner

*Primary Examiner* — Robert R Raevis
(74) *Attorney, Agent, or Firm* — Morse, Barnes-Brown & Pendleton, P.C.; Martin Z. Zhang, Esq.

(57) ABSTRACT

A tubular assembly includes a tubular member, a measuring instrument, and a flow-guiding device. The tubular member includes intersecting first and second tube walls respectively defining first and second passages for passage of a fluid therethrough. The measuring instrument is connected to the second tube wall, and detects physical conditions of the fluid flowing through the second passage. The flow-guiding device is mounted to the tubular member, and includes a ring member mounted to the second tube wall and a blade set extending through the ring member, extending into the second and first passages, and including a plurality of blades that are angularly spaced-apart from each other. Each blade has two opposite guiding surfaces. The guiding surfaces of two of the blades guide the fluid that flows in the first passage to flow into the second passage to be detected by the measuring instrument.

10 Claims, 7 Drawing Sheets

TUBULAR ASSEMBLY AND FLOW GUIDING DEVICE OF THE SAME

FIELD

The disclosure relates to a tubular assembly, and more particularly to a tubular assembly for detecting physical conditions of a fluid flowing therethrough and a flow-guiding device thereof.

BACKGROUND

Figure 1:
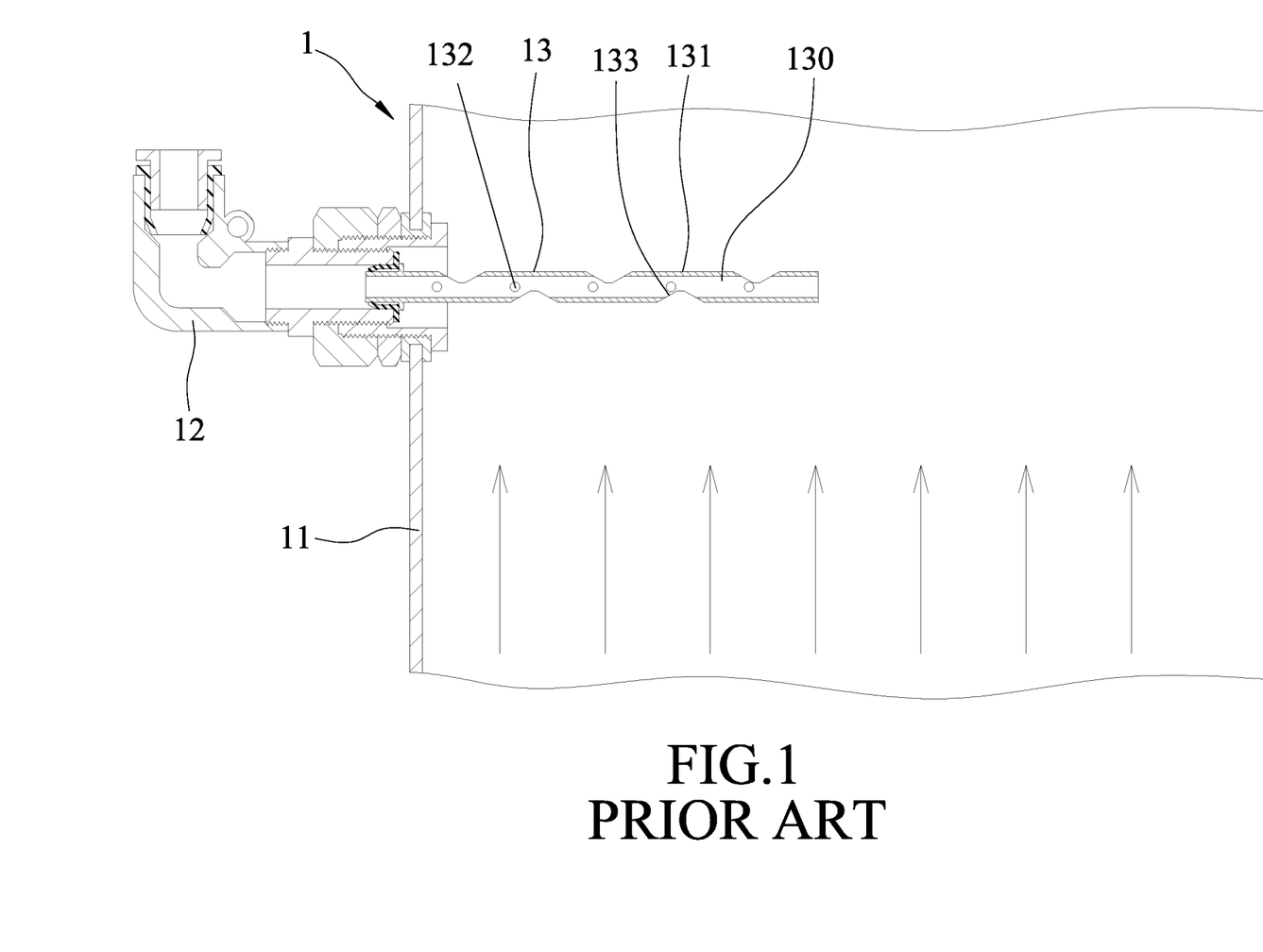
FIG. 1 is a schematic sectional view of a conventional gas detector sampling device disclosed in Taiwanese Invention Patent No. I687670.

Referring to FIG. 1, a conventional gas detector sampling device 1 disclosed in Taiwanese Invention Patent No. I687670 includes a large diameter tube 11, a composite rotating joint 12 mounted to the large diameter tube 11, and an airflow tube 13 extending into and disposed between the large diameter tube 11 and the composite rotating joint 12. The airflow tube 13 includes a pipe wall 131 defining a passage 130 therein. The pipe wall 131 is formed with a plurality of short holes 132 and a plurality of long holes 133 that are in spatial communication with the passage 130 of the airflow tube 13. When a fluid flows through the large diameter tube 11 as depicted by upward arrows in FIG. 1, the fluid enters the passage 130 via the short holes 132 and the long holes 133, and subsequently enters the composite rotating joint 12 through the passage 130.

The main purpose of the Patent No. I687670 is to stably sample the fluid flowing through the passage 130. Specifically, the fluid flows through the short holes 13 into the passage 130 and is contracted, and flows through the long holes 133 into the passage 130, such that a stabilized flow of fluid flows toward the composite rotating joint 12.

However, in a case where a pressure, a flow rate, or a temperature of the fluid in the large diameter tube 11 is to be detected, due to the structure of the conventional gas detector sampling device 1, the fluid flowing toward the composite rotating joint 12 may be distorted and detection of the fluid may be inaccurate.

SUMMARY

Therefore, an object of the disclosure is to provide a tubular assembly and a tubular assembly that can alleviate at least one of the drawbacks of the prior art.

According to an aspect of the disclosure, a tubular assembly adapted for detecting physical conditions of a fluid flowing therethrough is provided. The tubular assembly includes a tubular member, a measuring instrument, and a flow-guiding device. The tubular member includes a first tube wall and a second tube wall. The first tube wall surrounds a first axis and defines a first passage that is adapted for passage of the fluid therethrough. The second tube wall surrounds a second axis that is transverse to the first axis, and defines a second passage that is in fluid communication with the first passage and that is adapted for passage of the fluid therethrough. The measuring instrument is connected to the second tube wall of the tubular member, and is adapted for detecting the physical conditions of the fluid flowing through the second passage. The flow-guiding device is mounted to the tubular member, and includes a ring member and a blade set. The ring member surrounds the second axis and is mounted to the second tube wall. The blade set extends through the ring member, extends into the second passage and the first passage, has a width in a direction transverse to the first axis and the second axis that is equal to a width of each of the first passage and the second passage in the direction, and includes a plurality of blades that are angularly spaced-apart from each other. Each of the blades has two opposite guiding surfaces, a side edge surface that interconnects the guiding surfaces and that abuts against an inner surface of the second tube wall, and an end edge surface that interconnects the guiding surfaces and that abuts against an inner surface of the first tube wall. The guiding surfaces of at least two of the blades are adapted to guide the fluid that flows in the first passage to flow into the second passage to be detected by the measuring instrument.

According to another aspect of the disclosure, a flow-guiding device is adapted for use in a tubular assembly. The tubular assembly includes a tubular member and a measuring instrument. The tubular member includes a first tube wall and a second tube wall. The first tube wall surrounds a first axis and defines a first passage for passage of fluid therethrough. The second tube wall surrounds a second axis that is transverse to the first axis, and defines a second passage that is in fluid communication with the first passage and that is for passage of the fluid therethrough. The measuring instrument is connected to the second tube wall of the tubular member for detecting physical conditions of the fluid flowing through the second passage. The flow-guiding device is adapted to be mounted to the tubular member and includes a blade set that is adapted to extend into the second passage and the first passage, that has a width in a direction transverse to the first axis and the second axis that is adapted to be equal to a width of each of the first passage and the second passage in the direction, and that includes a plurality of blades angularly spaced-apart from each other. Each of the blades has two opposite guiding surfaces, a side edge surface that interconnects the guiding surfaces and that is adapted to abut against an inner surface of the second tube wall, and an end edge surface that interconnects the guiding surfaces and that is adapted to abut against an inner surface of the first tube wall. The guiding surfaces of at least two of the blades are adapted to guide the fluid that flows in the first passage to flow into the second passage to be detected by the measuring instrument.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

It should be noted herein that for clarity of description, spatially relative terms such as "top," "bottom," "upper,"

"lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 2:
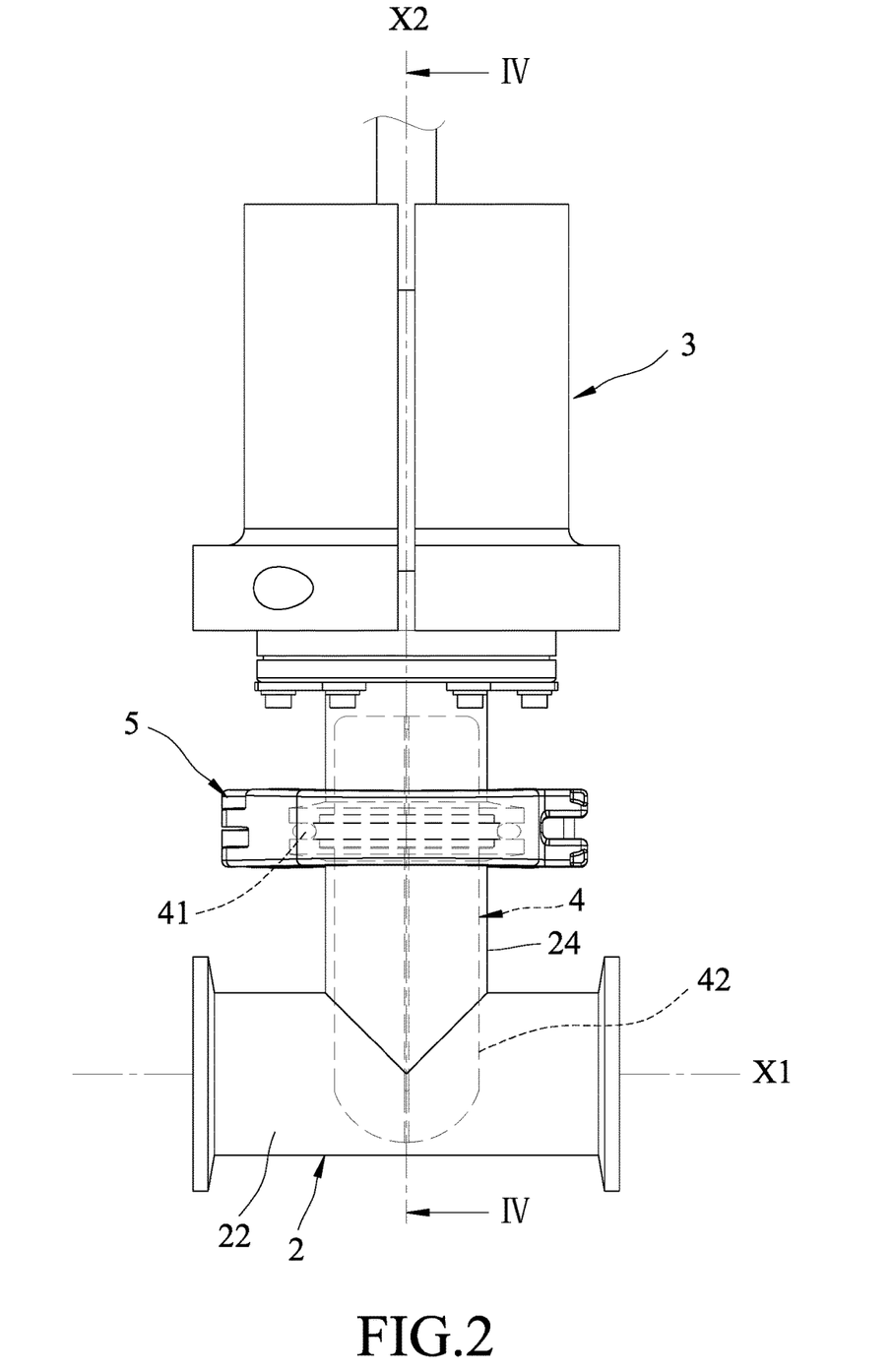
FIG. 2 is a schematic front view of a tubular assembly of an embodiment according to the present disclosure for detecting physical conditions of a fluid flowing therethrough.
Figure 3:
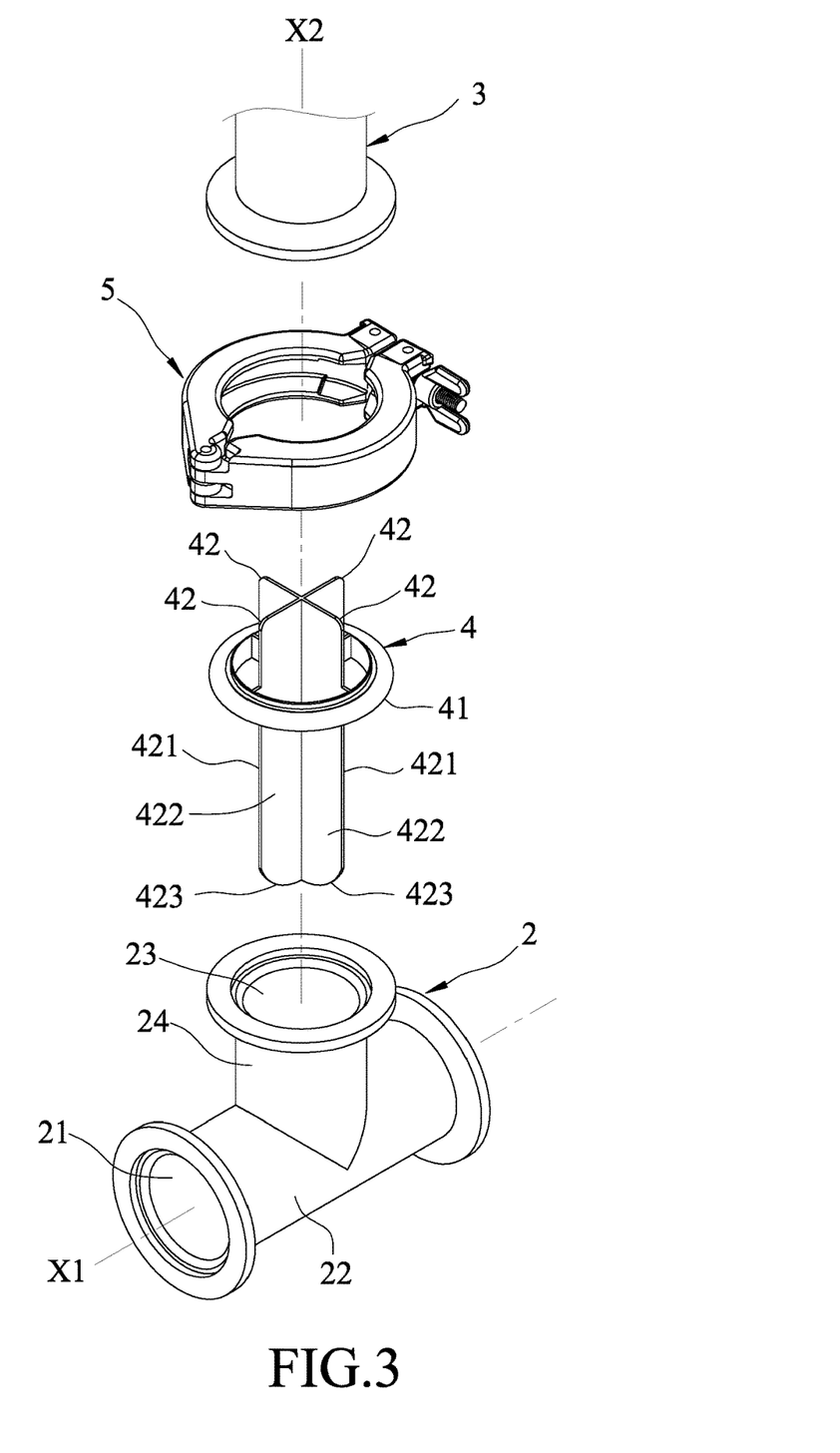
FIG. 3 is a fragmentary perspective view of the embodiment.
Figure 4:
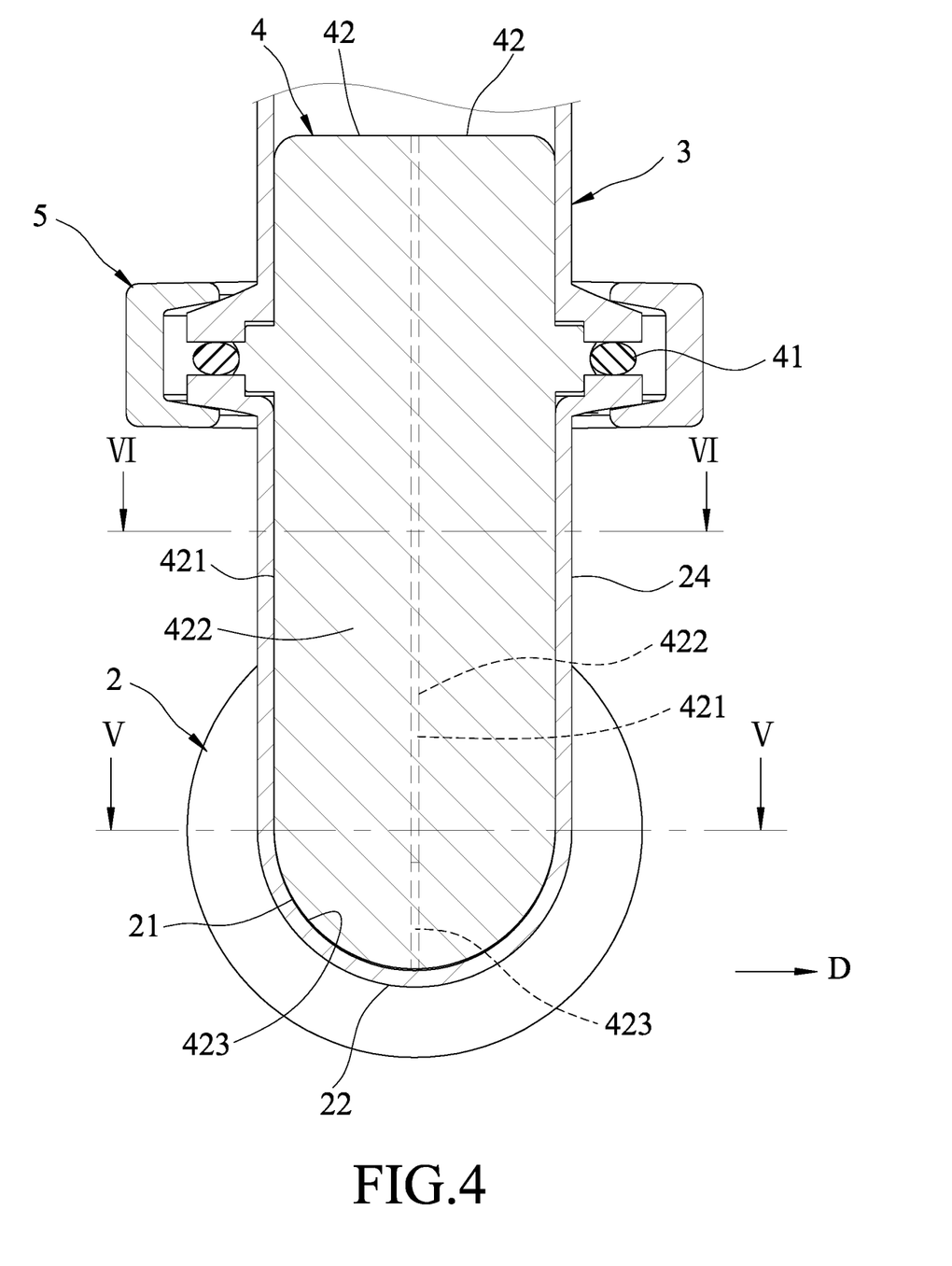
FIG. 4 is a fragmentary sectional view taken along line IV-IV in FIG. 2.
Figure 5:
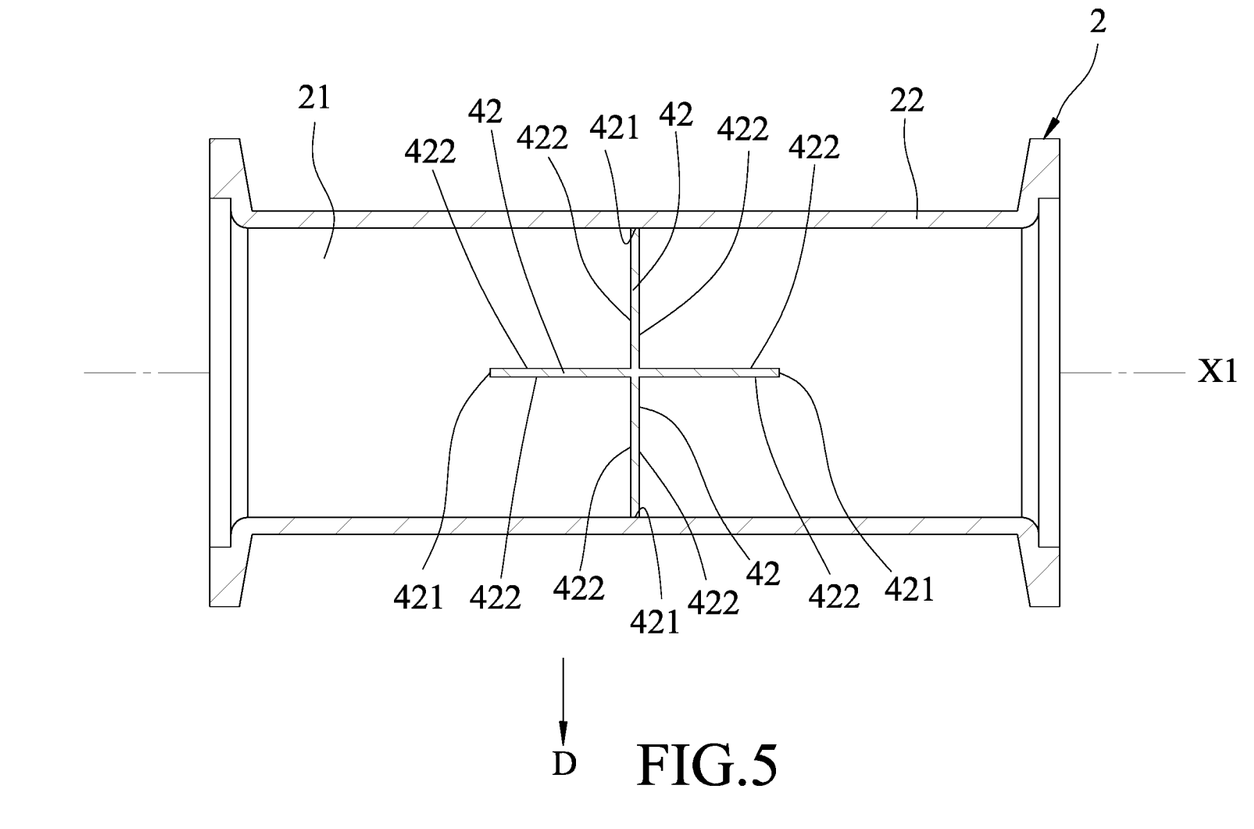
FIG. 5 is a sectional view taken along the line V-V in FIG. 4.

Referring to FIGS. 2 to 4, a tubular assembly of an embodiment according to the present disclosure is adapted for detecting physical conditions of a fluid flowing therethrough, and includes a tubular member 2, a measuring instrument 3, and a flow-guiding device 4.

The tubular member 2 includes a first tube wall 22 and a second tube wall 23. The first tube wall 22 surrounds a first axis (X1), and defines a first passage 21 that is adapted for passage of the fluid therethrough. The second tube wall 24 surrounds a second axis (X2) that is transverse to the first axis (X1), and defines a second passage 23 that is in fluid communication with the first passage 21 and that is adapted for passage of the fluid therethrough. The first axis (X1) and the second axis (X2) cooperatively define an angle. In this embodiment, the angle between the first axis (X1) and the second axis (X2) is substantially 90 degrees, the first passage 21 is a cylindrical passage, and the fluid is a gas or a liquid.

The measuring instrument 3 is connected to the second tube wall 24, and is adapted for detecting the physical conditions of the fluid flowing through the second passage 23. The measuring instrument 3 includes one of a pressure gauge, a flow meter, a thermometer, a hygrometer, a partial pressure analyzer, a concentration meter, and a combination thereof but the present disclosure is not limited to the examples described herein.

As shown in FIGS. 3 to 6, the flow-guiding device 4 is mounted to the tubular member 2, and includes a ring member 41 surrounding the second axis (X2) and mounted to the second tube wall 24, and a blade set extending through the ring member 41, extending into the second passage 23 and the first passage 21, and includes a plurality of blades 42. In this embodiment, the number of the blades 42 is four.

In this embodiment, the ring member 41 is a rubber ring that is clamped between and in airtight contact with the second tube wall 24 and the measuring instrument 3.

In this embodiment, the blade set has a width in a direction (D) transverse to the first axis (X1) and the second axis (X2) that is equal to a width of each of the first passage 21 and the second passage 23 in the direction (D). The blades 42 are equi-angularly spaced apart from each other. Each adjacent pair of the blades 42 cooperatively define a flow-guiding channel 420 that extends from the first passage 21 to the second passage 23 for passage of the fluid therethrough. Each of the blades 42 has two opposite guiding surfaces 422, a side edge surface 421 that interconnects the guiding surfaces 422 and that abuts against an inner surface of the second tube wall 24, and an end edge surface 423 that interconnects the guiding surfaces 422 and that abuts against an inner surface of the first tube wall 22. The guiding surfaces 422 extend from the first passage 21 to the second passage 23 and partially extend into the measuring instrument 3. In this embodiment, the number of the flow-guiding channel 420 is four.

Figure 6:
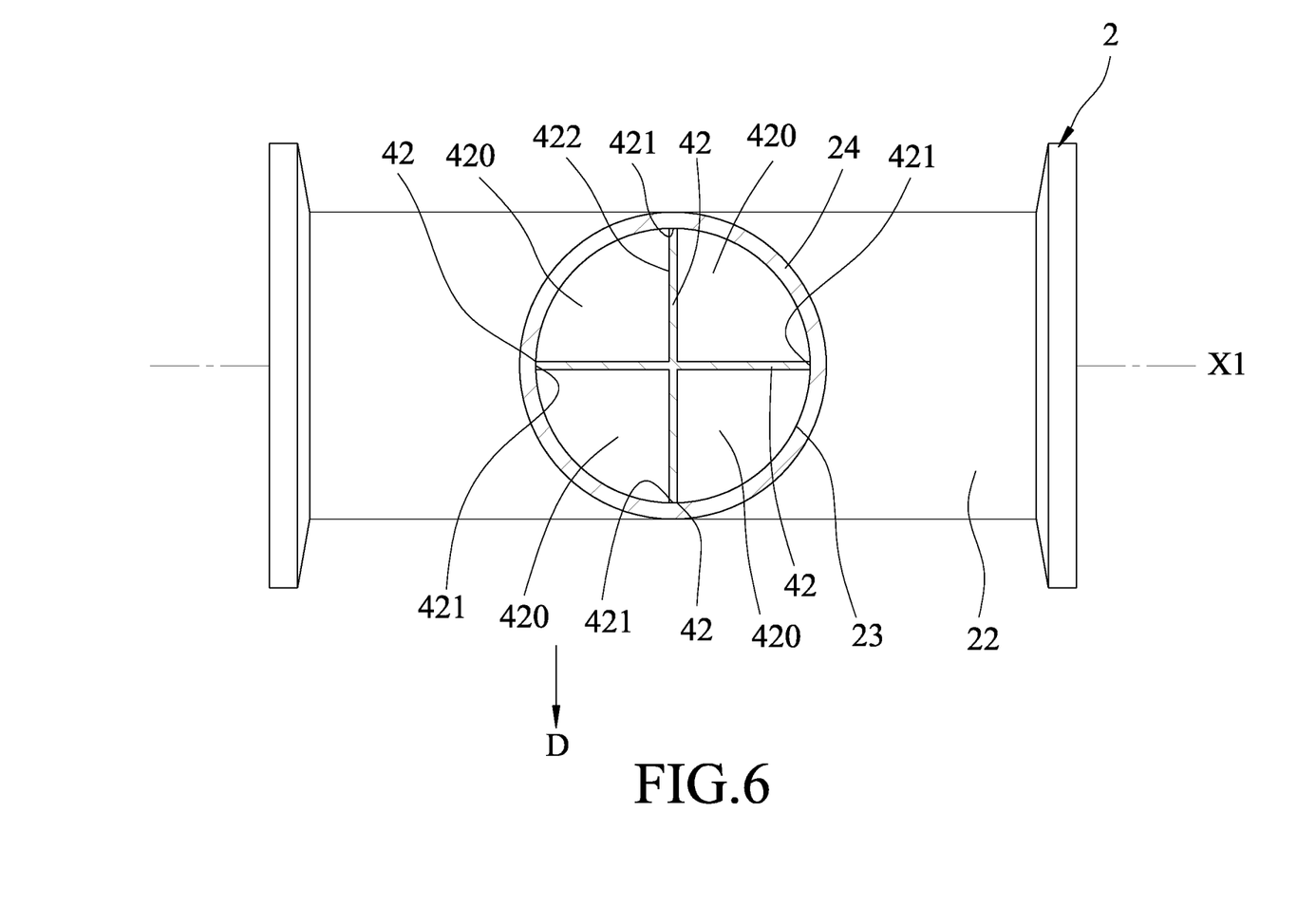
FIG. 6 is a sectional view taken along the line VI-VI in FIG. 4.

It should be noted that, since the side edge surface 421 and the end edge surface 423 of each of the blades 42 respectively abut against the inner surface of the second tube wall 24 and the inner surface of the first tube wall 22, the first passage 21 is divided into two halves (see FIG. 5), and the second passage 23 is divided into four portions (see FIG. 6).

The retaining ring 5 is removably and tightly sleeved on the measuring instrument 3, the ring member 41 of the flow-guiding device 4, and the second tube wall 24 for securing the measuring instrument 3 and the flow-guiding device 4 to the second tube wall 24.

Figure 7:
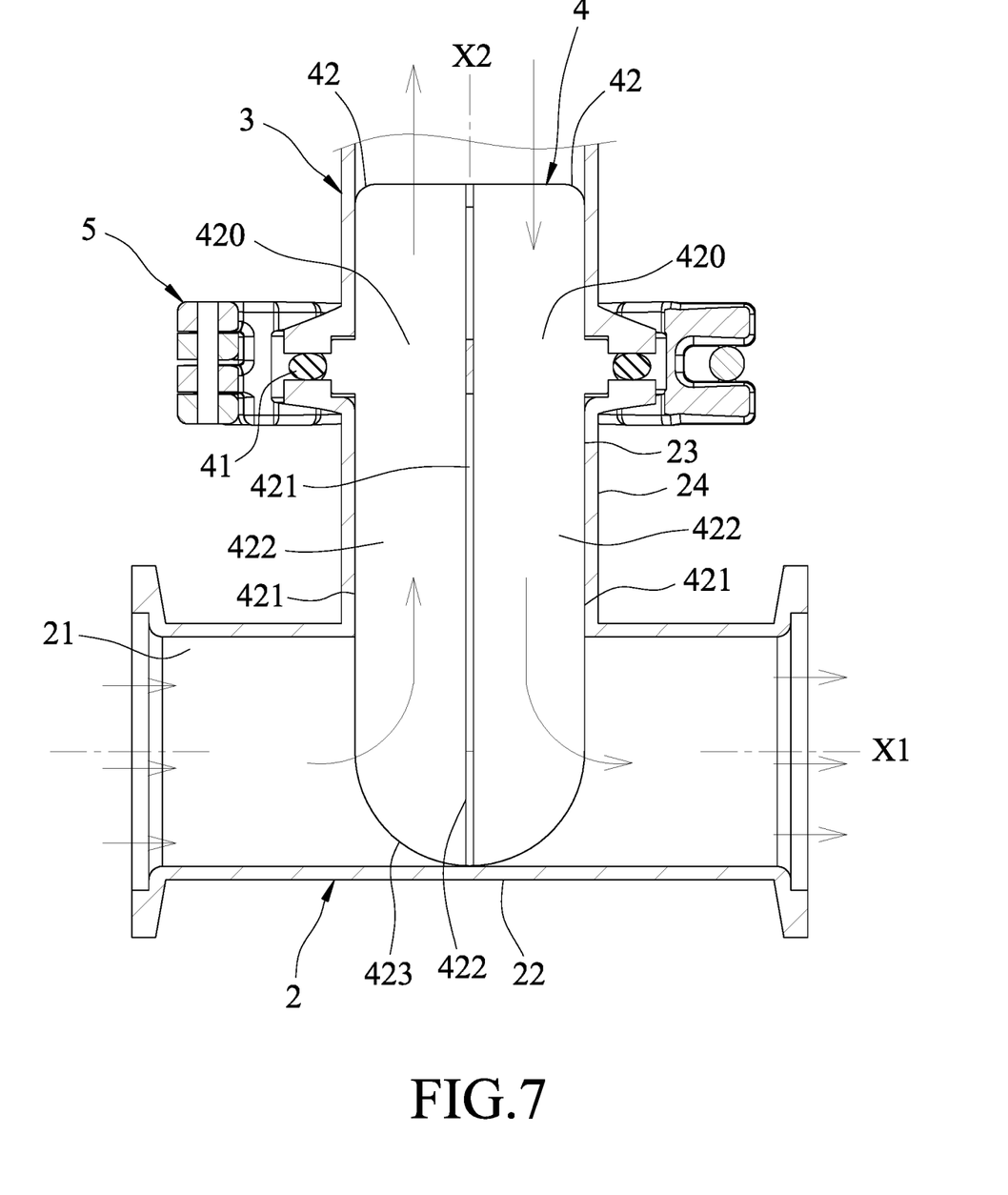
FIG. 7 is a fragmentary schematic sectional view of the embodiment, illustrating directions of the fluid flowing in the tubular assembly.

Further referring to FIG. 7, when the fluid flows in the tubular member 2, the guiding surfaces 422 of two of the blades 42 are adapted to guide the fluid flowing in the first passage 21 into the second passage 23, and for ease of description, the guiding surfaces 422 of two of the blades 42 are referred to as "an inlet surface" hereinafter. It should be noted that, the guiding surfaces 422 of two of the blades 42 that are opposite to the inlet surface are referred to as "an outlet surface" hereinafter. As depicted by the arrows in FIG. 7, the fluid flows from an upstream of the first passage 21 along two of the flow guiding channels 420 that face the inlet surface into the second passage 23 to be detected by the measuring instrument 3, and flows along the other two of the flow guiding channels 420 that face the outlet surface toward a downstream of the first passage 21. It should be noted that the upstream and the downstream of the first passage 21 correspond respectively to the two halves of the first passage 21, and are located respectively at left and right portions of the first passage 21 shown in FIG. 7. In this way, a direction of the fluid is changed by virtue of the blade set 4 so the physical conditions of the fluid may be detected by the measuring instrument 3 in real time in a relatively efficient manner.

It should be noted that the number of the blades 42 is not limited to four, and in other embodiments of the present disclosure, the blade set 4 may include one, two, three or more than four blades 42 as long as the first passage 21 is divided into two halves, i.e., an upstream and a downstream. In implementation of the present disclosure, the inlet surface is adapted to face the fluid flowing in the upstream of the first passage 21 in the tubular member 2, and guide the fluid to flow toward the second passage 23, and the outlet surface is adapted to guide the fluid from the second passage 23 to flow to the downstream of the first passage 21.

Through the above description, advantages of the embodiment are described as follows. By virtue of the guiding surfaces 422 that extend from the first passage 21 to the second passage 23, the fluid flows from the upstream of the first passage 21 may be guided by the inlet surface to stably and quickly flow into the second passage 23 to be detected by the measuring instrument 3, and be subsequently guided by the outlet surface to the downstream of the first passage 21. In this way, the physical conditions of the fluid may be detected in a relatively efficient manner.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A tubular assembly adapted for detecting physical conditions of a fluid flowing therethrough, comprising:
a tubular member that includes
a first tube wall surrounding a first axis and defining a first passage that is adapted for passage of the fluid therethrough, and
a second tube wall surrounding a second axis that is transverse to the first axis, and defining a second passage that is in fluid communication with said first passage and that is adapted for passage of the fluid therethrough;
a measuring instrument that is connected to said second tube wall of said tubular member, and that is adapted for detecting physical conditions of the fluid flowing through said second passage; and
a flow-guiding device that is mounted to said tubular member and that includes
a ring member surrounding the second axis and mounted to said second tube wall, and
a blade set extending through said ring member, extending into said second passage and said first passage, having a width in a direction transverse to the first axis and the second axis that is equal to a width of each of said first passage and said second passage in the direction, and including a plurality of blades that are angularly spaced-apart from each other,
wherein each of said blades has
two opposite guiding surfaces,
a side edge surface that interconnects said guiding surfaces and that abuts against an inner surface of said second tube wall, and
an end edge surface that interconnects said guiding surfaces and that abuts against an inner surface of said first tube wall, said guiding surfaces of at least two of said blades being adapted to guide the fluid that flows in said first passage to flow into said second passage to be detected by said measuring instrument.

2. The tubular assembly as claimed in claim 1, wherein said measuring instrument includes one of a pressure gauge, a flow meter, a thermometer, a hygrometer, a partial pressure analyzer, a concentration meter, and a combination thereof.

3. The tubular assembly as claimed in claim 1, wherein:
said blades are equi-angularly spaced apart from each other; and
each adjacent pair of said blades cooperatively define a flow-guiding channel that extends from said first passage to said second passage for passage of the fluid therethrough.

4. The tubular device as claimed in claim 1, wherein:
said first passage is a cylindrical passage; and
said end edge surface of each of said blades is arcuate.

5. The tubular assembly as claimed in claim 1, wherein said ring member of said flow-guiding device is clamped between and is in airtight contact with said second tube wall and said measuring instrument.

6. The tubular assembly as claimed in claim 1, further comprising a retaining ring removably and tightly sleeved on said measuring instrument, said ring member of the flow-guiding device, and said second tube wall for securing said measuring instrument and said flow-guiding device to said second tube wall.

7. A flow-guiding device adapted for use in a tubular assembly, the tubular assembly including
a tubular member that includes
a first tube wall surrounding a first axis and defining a first passage for passage of fluid therethrough, and
a second tube wall surrounding a second axis that is transverse to the first axis, and defining a second passage that is in fluid communication with the first passage and that is for passage of the fluid therethrough, and
a measuring instrument that is connected to the second tube wall of the tubular member for detecting physical conditions of the fluid flowing through the second passage,
said flow-guiding device being adapted to be mounted to the tubular member and comprising:
a blade set that is adapted to extend into the second passage and the first passage, that has a width in a direction transverse to the first axis and the second axis that is adapted to be equal to a width of each of the first passage and the second passage in the direction, and that includes a plurality of blades angularly spaced-apart from each other;
wherein each of said blades has
two opposite guiding surfaces,
a side edge surface that interconnects said guiding surfaces, and that is adapted to abut against an inner surface of the second tube wall, and
an end edge surface that interconnects said guiding surfaces and that is adapted to abut against an inner surface of the first tube wall, said guiding surfaces of at least two of said blades being adapted to guide the fluid that flows in the first passage to flow into the second passage to be detected by the measuring instrument.

8. The flow-guiding device as claimed in claim 7, further comprising a ring member surrounding the second axis, and adapted to be in airtight contact with the second tube wall of the tubular member, said blade set extending along the second axis through said ring member.

9. The flow-guiding device as claimed in claim 7, wherein:
said blades are equi-angularly spaced apart from each other; and
each adjacent pair of said blades cooperatively define a flow-guiding channel that is adapted to extend from the first passage to the second passage for passage of the fluid therethrough.

10. The flow-guiding device as claimed in claim 7, wherein said end edge surface of each of said blades is arcuate.

* * * * *